United States Patent [19]

Fossas et al.

[11] Patent Number: 4,703,499
[45] Date of Patent: Oct. 27, 1987

[54] DISTRIBUTED PRIVACY ORIENTED TELEPHONE EXTENSION SYSTEM

[76] Inventors: Arturo Fossas, Miramar Ave. 706 Apt. 6, San Juan, P.R. 00907; Orlando Ruiz, Z1-6, 18 St., Monte Carlo Rio Piedras, P.R. 00926

[21] Appl. No.: 831,558

[22] Filed: Feb. 21, 1986

[51] Int. Cl.[4] .......................... H04M 1/70; H04M 3/16
[52] U.S. Cl. ...................................... 379/194; 379/387; 379/442
[58] Field of Search .................. 179/17 B, 99 E, 99 R, 179/30, 38, 81 R, 2.51; 370/71, 72, 73, 76; 379/361, 387, 397, 102, 157, 171, 172, 194, 195, 442

[56] References Cited

U.S. PATENT DOCUMENTS

| 3,691,308 | 9/1972 | Anger et al. | 179/17 B |
|---|---|---|---|
| 3,822,366 | 7/1974 | O'Dea et al. | 370/71 |
| 3,852,537 | 12/1974 | Vincent | 179/17 B |
| 3,870,829 | 3/1975 | Chacon | 179/30 |
| 4,384,171 | 5/1983 | Klee | 179/84 C |

FOREIGN PATENT DOCUMENTS

0115660  7/1984  Japan ................................. 179/2.51

Primary Examiner—Gene Z. Rubinson
Assistant Examiner—C. Champion
Attorney, Agent, or Firm—John J. Byrne

[57] ABSTRACT

A distributed privacy oriented telephone extension system having up to three different kinds of privacy circuits of different capacity for coupling a respective extension phone to the telephone line. Selective user configuration of the telephone extension system effects one level of privacy control and spontaneous user control during conversation to disconnect or reconnect other phones effects a second level of user control relating to the extent of privacy achieved.

23 Claims, 13 Drawing Figures

DISTRIBUTED PRIVACY ORIENTED TELEPHONE EXTENSION SYSTEM

TECHNICAL FIELD

This invention relates to a novel distributed network of a telephone extension connect/disconnect privacy system. More particularly, this invention relates to a telephone system wherein a single user may connect or disconnect other phone units on the same extension line at will.

The basic concept of this system is to preserve for the phone subscriber a choice to configure multiple phone units on the same extension number with a desired degree of privacy control capability or responsiveness alloted to each phone. Depending on the selected configuration, a user at one location may lock out multiple units at each of the other locations or be locked out by a user operating another unit at a different location.

BACKGROUND ART it has been a growing concern for telephone subscribers of multiple units on a single line that their rights to private communication are jeopardized by unsuspecting ears on other units. This fear is balanced against the practical efficiency of having multiple units coupled with or to the same extension line. Multiple units on the same line serve well to provide telephone convenience to a broader geographical area and to provide communication in a conference setting wherein multiple parties may be on line simultaneously. However, where the specific operating environment has particular requirements for privacy, it is often desirable that all but one phone be excluded from the line when private communication is conducted via that one phone.

A number of advances in the telephone art occurred in the recent past when a privacy exclusion circuit was adopted for telephone units coupled on the same extension line. This system has special application in key telephone systems wherein an extension phone may come on line by depressing a key on the extension set. These prior art systems unilaterally adopt a scheme wherein the first phone taken offhook to answer an incoming call or to initiate a call seizes the telephone line and prevents all other extension phones from coming on line. In this manner, confidentiality is assured and private communications are implemented for each user who manages to obtain an active line.

While such systems have, to a certain extent, achieved privacy in communications, room for significant and meaningful improvement exists.

The systems of the prior art are not flexible. First, a user does not exercise control over whether other units should remain connected to the phone line once a conversation starts. Second, the capability of connecting and disconnecting other telephones is limited to one reconnection. Third, all units are necessarily affected by such prior art systems; no means is provided for certain units to operate as master sets and/or slave sets. Fourth, prior art systems are not modular in their connection to the telephone line.

The problems suggested in the preceding are not intended to by exhausting, but rather among many which may tend to detract from the usefulness of prior systems supporting privacy on an extension line having multiple units coupled thereto. Other noteworthy problems may exist. However, those presented above should be sufficient to demonstrate that implementations of privacy communication on a telephone line supporting multiple units have not been altogether satisfactory.

DISCLOSURE OF INVENTION

One preferred embodiment of the instant invention which is intended to accomplish at least some of the foregoing objects comprises a first phone unit and a second phone unit coupled in parallel to the same telephone line leading to a central exchange switching station. A user controlled transmitter privacy circuit is coupled between the first phone unit and the telephone line and an automatically activated receiver privacy circuit is coupled between the telephone line and the second phone unit. The transmitter privacy circuit is responsive to a user of the first phone unit for transmitting a first high frequency signal to the receiver privacy circuit which is responsive thereto for disconnecting said second phone unit from the telephone line if said second phone unit is presently connected to the line, and for transmitting a second high frequency signal to the receiver privacy circuit which is responsive thereto for connecting said second phone unit to the line if said second unit is presently disconnected from the line. Any frequency can perform the task. For pratical purposes the frequency of the tone is selected to be higher than that of the ordinary voice band in order to avoid any conflict or interface with the audio communication on the line. A frequency of 16 Khz or above is adequate.

It is, therefore, a general object of the invention to provide a flexible telephone system for achieving private communications on multiple phone units on the same line.

It is a particular object of this invention to provide for direct user control of whether a particular communication over the phone will be excluded from at least one other unit coupled to the same line.

It is also a particular object of this invention to provide for direct user control of whether at least one phone unit previously excluded from a communication can be allowed to come back on line in the same communication.

It is another particular object of this invention to connect multiple privacy oriented extension phone stations and at least one other extension phone unit independent of any circuitry for achieving privacy of communication, to the same telephone line.

It is another object of the invention to establish a decentralized network of privacy oriented extension phone stations wherein at least a plurality of such stations exhibit a different degree of privacy of communication.

It is another object of the invention to permit a subscriber to freely configure a plurality of extension phone units with or without connecting a privacy circuit device thereto.

It is also another object of the instant invention to achieve any combination of the foregoing objectives.

DETAILED DESCRIPTION

Figure 1:
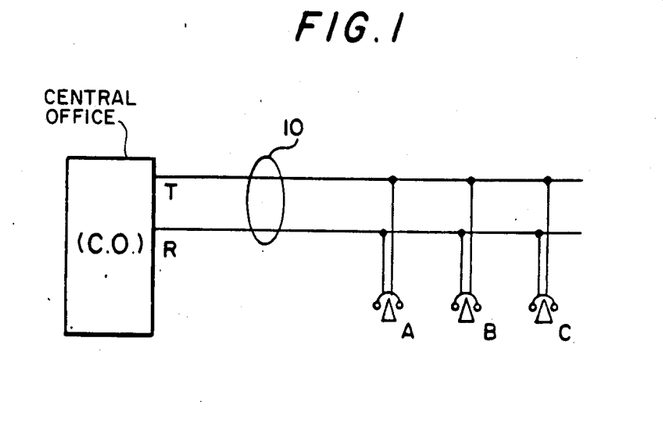
FIG. 1 illustrates the general operating environment of the subject invention.

Referring now to the drawings wherein like numbers indicate like parts, in FIG. 1 the general operating environment prior to inclusion of the system of the subject invention is shown. A subscriber line 10 is coupled to a public central exchange, (C.O.). T and R are the tip and ring of the subscriber line. A, B, and C are telephone sets connected in parallel to the same subscriber line 10, as would be the case in an ordinary extension line arrangement. On a typical application, A, B and C are phones connected within a house, each located in a different room, and all three phones are extensions for the same telephone number.

Figure 2A:
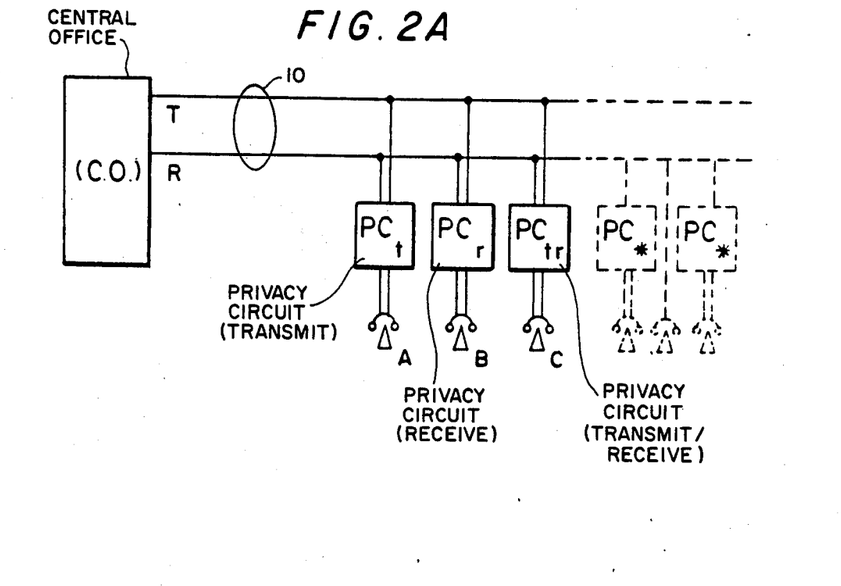
FIG. 2A illustrates the general configuration of one particular embodiment of the subject invention.
Figure 4:
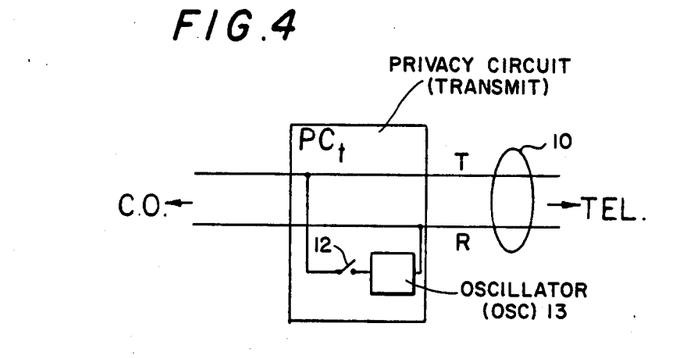
FIG. 4 illustrates the internal components of the privacy circuit $PC_t$.
Figure 5:
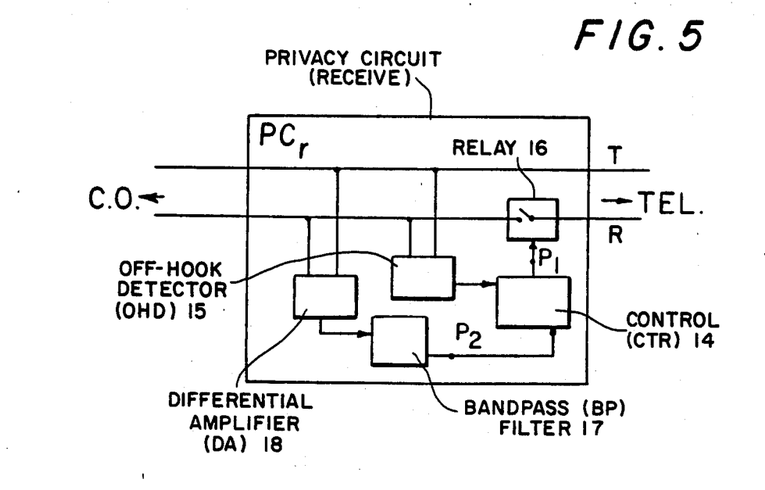
FIG. 5 illustrates the internal components of the privacy circuit $PC_r$.
Figure 6:
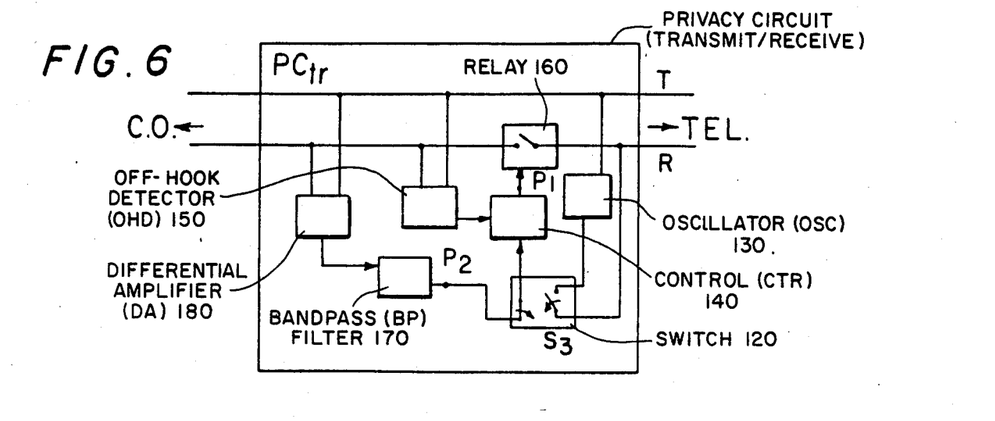
FIG. 6 illustrates the internal components of the privacy circuit $PC_{tr}$.

FIG. 2A illustrates the general operating environment of one particular embodiment of the instant invention. Three privacy circuits, $PC_t$ (transmit), $PC_r$ (receive), and $PC_{tr}$ (transmit/receive), each of different design and capability, are respectively coupled between a telephone set and the subscriber line 10. Referring to FIGS. 4–6, $PC_t$ and $PC_{tr}$ include switch units 12 and 120, respectively, for generating a high frequency tone across T and R when activated. $PC_r$ and $PC_{tr}$ include control units 14 and 140, respectively, for monitoring the subscriber line and relay units 16 and 160, respectively, for selectively connecting a corresponding telephone set to the line. Each control unit 14 and 140 is responsive to monitored signals to regulate the state of a corresponding relay unit 16 and 160.

During a telephone on-hook condition, all phones are connected to 140 in C.O. via the subscriber line 10. Control units 14 and 140 in $PC_r$ and the $PC_{tr}$ ignore any signal in the T and R lines. Once any phone goes off-hook, control units 14 begin to monitor T and R of the subscriber line. A user having phone A off the hook for answering or initiating a call may activate the switch unit 12 in $PC_t$, and a signal is then transmitted across T and R. Control units 14 in $PC_r$ and 140 in $PC_{tr}$ detect this signal and open corresponding relays 16 and 160. In this manner, telephones B and C are thus disconnected from the subscriber line. A second activation by the user at phone A of the switch unit 12 generates another signal across T and R which is similarly detected by control units 14 in $PC_r$ and 140 in $PC_{tr}$ to close corresponding relays and reconnect telephone units B and C to the subscriber line. Everytime a control unit 14 or 140 detects a tone signal generated by a switch unit across T and R, the corresponding relay 16 or 160 changes state. Regardless of the state of relays 16 and 160, when all off-hook phones go back on-hook, in this case phone A, all relay units are closed and all phones are back on line.

In the embodiment shown in FIG. 2A, phone A can never be disconnected from the subscriber line because $PC_t$ does not include a control unit 14 or a relay 16. However, via switch unit 12, a user of phone A may disconnect all other phones coupled to a privacy circuit having a control unit for monitoring the T and R and operating a relay. A user of phone B can never disconnect any phone from the line because $PC_r$ does not include a switch unit 12 for generating a tone signal across T and R. However, phone B may be disconnected through tone signal generation at phones A and C which are coupled to a privacy circuit having a switch unit 12. $PC_{tr}$ includes a control unit 140 a relay 160, and a switch unit 120. Therefore, a user of phone C may disconnect other phones and phone C itself may also be disconnected. It is important to note that all disconnected phones may be reconnected by a subsequent signal across T and R since a disconnection of a phone from the subscriber line does not operate to terminate monitoring of the T and R by a control unit in the privacy circuit coupled to a correspondingly disconnected phone. It is also important to note that a phone can never disconnect itself from the subscriber line. For instance, control unit 140 in $PC_{tr}$ is not responsive to a signal generated via switch unit 120 of $PC_{tr}$ to alter the state of relay 160 in $PC_{tr}$.

The embodiment of FIG. 2A is intended to illustrate the operation of the subject invention wherein at least three different kinds of privacy circuits are employed. Furthermore, a plurality of additional phones may be coupled in parallel with or without an intervening privacy circuit of any kind. These units are optional and shown in phantom lines. Their inclusion in combination with phones A, B and C effect a system the operation of which is also in accordance with the description above.

Figure 2B:
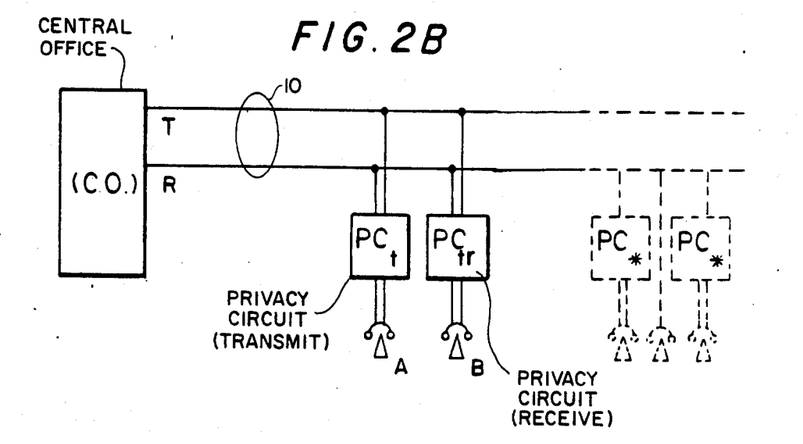
FIG. 2B illustrates the general configuration of another particular embodiment of the subject invention.

In FIG. 2B, a simpler embodiment of the instant invention is shown. In this embodiment, only two kinds of privacy circuits are used, $PC_t$ and $PC_r$. As previously described above, privacy circuit $PC_r$ is responsive to signals from a privacy circuit $PC_t$ to disconnect, and subsequently reconnect, a corresponding phone unit from the subscriber line.

Figure 2C:
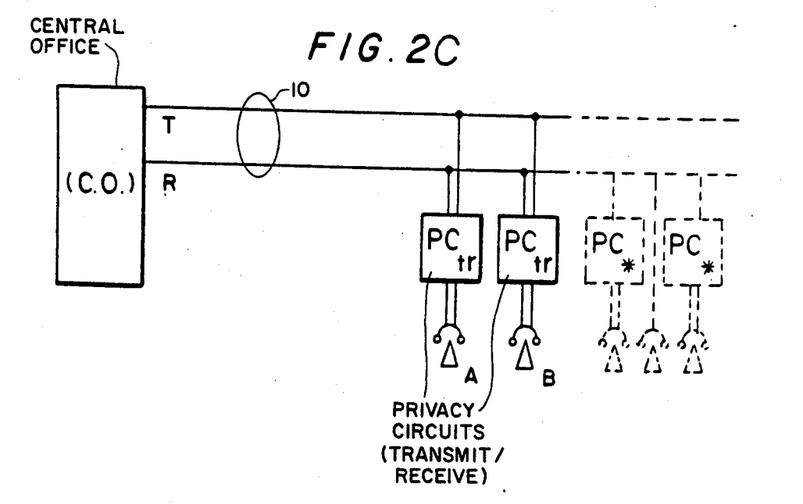
FIG. 2C illustrates the general configuration of a still further particular embodiment of the subject invention.

In FIG. 2C, a still further embodiment of the instant invention is shown wherein there are at least two privacy circuits $PC_{tr}$ respectively coupled to separate phones. In this embodiment, both phones, A and B may disconnect or reconnect other phones as well as themselves be disconnected or reconnected by another phone in the manner previously discussed above in the embodiment of FIG. 2A. Accordingly, phantom lines illustrate additional optional extension phones with or without intervening privacy circuits of the $PC_{tr}$ type for coupling to the subscriber line.

It should be noted that, in the embodiments shown in FIGS. 2A–2C above, any phone directly coupled to the subscriber line without an intervening privacy circuit of any kind operates independently of any privacy circuit functions. It does not disconnect or reconnect any other phone to the subscriber line nor can it be disconnected by any unit from the subscriber line. Phantom lines illustrate additional optional extension phones and corresponding privacy circuits of any kind, if any. A high frequency signal transmitted over the telephone line may be detected by all privacy circuits monitoring the line for the same signal for responding thereto.

Figure 3:
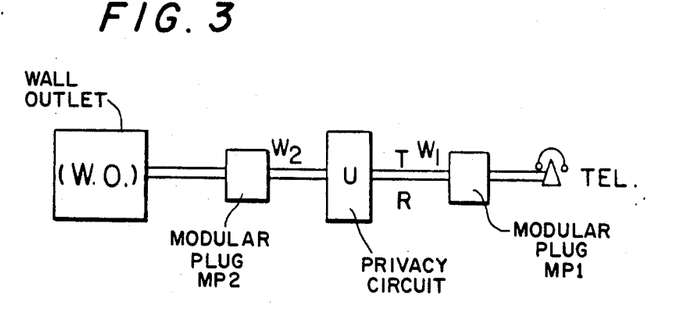
FIG. 3 illustrates the manner of connection between a privacy circuit, a corresponding extension phone, and the telephone line.

In FIG. 3, the manner of connecting a privacy circuit of any kind to a phone system is shown. Line W1 represents a telephone wire leading from a privacy circuit U and coupled to a modular plug MP1 connected to a telephone unit. Line W2 also leads from the privacy circuit U, and is coupled to a modular plug MP2 connected to a telephone line wall outlet. Many alternative configurations are possible, while the general concept of modular construction is shown by FIG. 3. Because of modularity, the subject invention can be easily installed, removed, or alternatively configured by an ordinary consumer not having any skill in electronics. The task is simply one of connecting and disconnecting wires from modular plugs.

A first type of privacy circuit, $PC_t$ is illustrated in FIG. 4. Switch 12, when pressed (closed), connects the oscillator 13 across T and R. Switch 12 is shown in FIG. 4 in an unpressed (open) state. The DC voltage across the line flows through the oscillator 13 and a tone is generated on the line 10. The frequency of the tone must be higher than that of the ordinary voiceband in order to avoid any conflict or interference with the audio communication on the line. For practical purposes, a frequency of approximately 16 Khz or above is adequate. FIG. 4 specifically shows the switch in an un-pressed (open) state.

A second type of privacy circuit, $PC_r$, is illustrated in FIG. 5. When a coupled phone unit is on-hook, the off-hook detector circuit 15 forces the control 14 to close relay 16 and avoids responding to any input from the band pass filter 17. The center frequency of the filter 17 is the same as that of the oscillator 13 shown in FIG. 4, selected to be 16 Khz or above.

Once a telephone goes off-hook, detector 15 releases the control 14 and the output at point P1 becomes dependent on the status of point P2.

The differential amplifier 18 receives the signal from T and R and outputs a corresponding signal to filter 17. During normal operation, P2 is idle. However, whenever a 16 Khz signal is sent and detected through T and R, filter 17 outputs a signal at P2; this is the monitoring function performed by the privacy circuit $PC_r$. The control 14 receives the signal present at P2 and changes the state of point P1. As a result the state of relay 16 toggles everytime a monitored high frequency signal appears across T and R. As the relay 16 changes state, a correspondingly coupled telephone becomes disconnected and reconnected to the line.

A third type of privacy circuit, $PC_{tr}$, is illustrated in FIG. 6. It includes the circuits of $PC_t$ and $PC_r$, as shown in FIGS. 4 and 5, with modification of proper interface. The oscillator 130 is now coupled to a double-pole double-throw (DPDT) switch 120. Switch 120 is normally closed at one end and opened at the other. With the switch idle, the oscillator 130 is not connected across T and R, and the control 140 is in a mode to change the state of the relay 160. This is the state specifically shown in FIG. 6.

When the switch 120 is pressed and thus dispositioned in an alternative manner, the oscillator 130 is connected across T and R and generates a tone signal on the line. At the same time, the other end of switch 120 flips open and signals the 140 not to respond to the tone appearing across T and R. In this manner, a phone will not be affected by a tone generated by a privacy circuit correspondingly coupled thereto.

$PC_{tr}$ privacy circuit as illustrated may function either as a $PC_t$ as shown in FIG. 4, or as a $PC_r$ as shown in FIG. 5.

Figure 7:
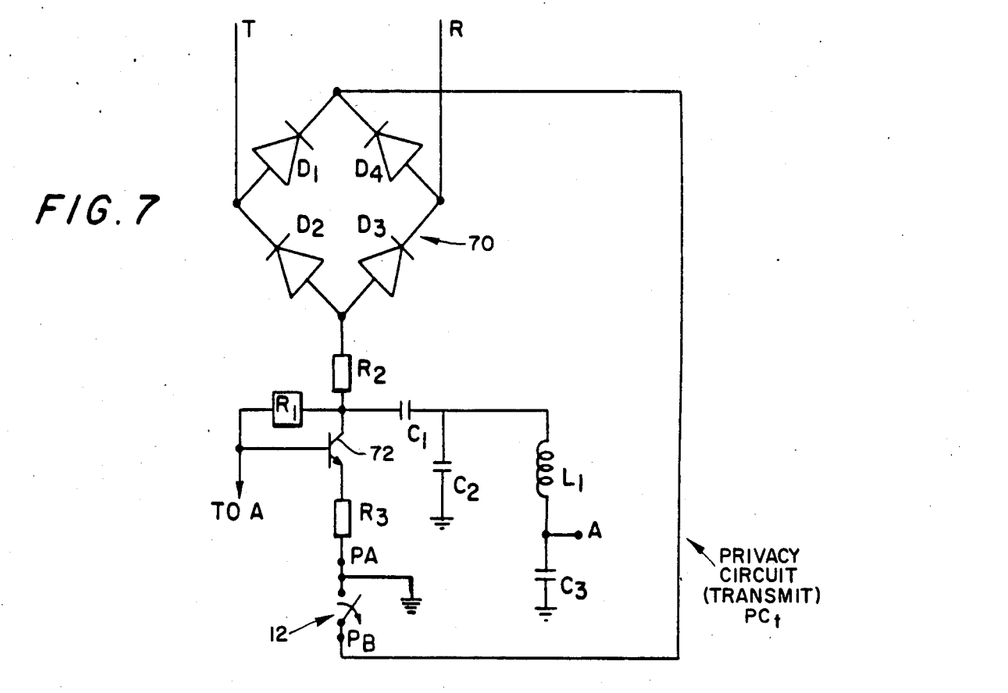
FIG. 7 illustrates detailed electrical circuits of the privacy circuit $PC_t$.

FIG. 7 illustrates the privacy circuit $PC_t$ in detail. Circuit $PC_t$ operates as a transmitter unit. It comprises a regular Colpitts oscillator enclosed on a regular rectifying diode bridge circuit 70. The bridge circuit 70 assures proper functioning of the oscillator circuit in the presence of a C.O. line polarity reversal. Resistors R1, R2 and R3 serve as a bias circuit for the transistor amplifier 72. Their value and interconnection is selected to assure a classical class A amplifier operation of the transistor 72 for any tip to ring line voltages from 1.5 to 20 volts D.C.

Capacitor C1 works as a coupling capacitor between the transistor amplifier 72 and a frequency selecting feedback circuit created by capacitors C2, C3 and inductor L1. This circuit selects a frequency of approximately 16 Khz. When the circuit is oscillating, a signal is transferred to the tip and ring wires due to the poor regulating effect of such wires when used as current supply for the oscillator circuit.

Figure 8:
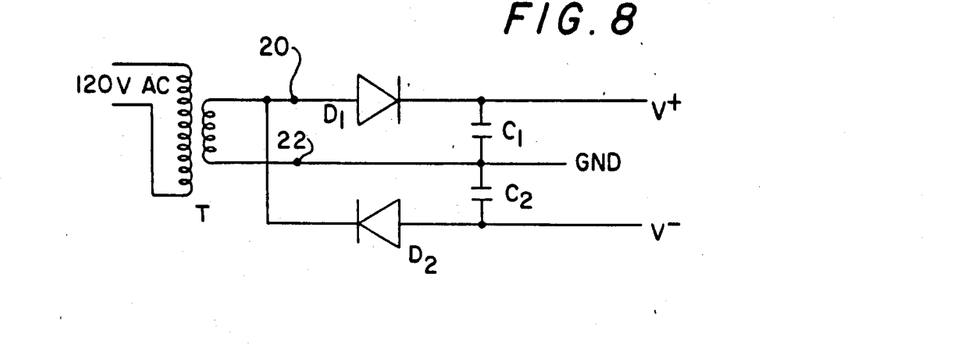
FIG. 8 illustrates a power supply for the privacy circuits $PC_r$ and $PC_{tr}$.
Figure 9:
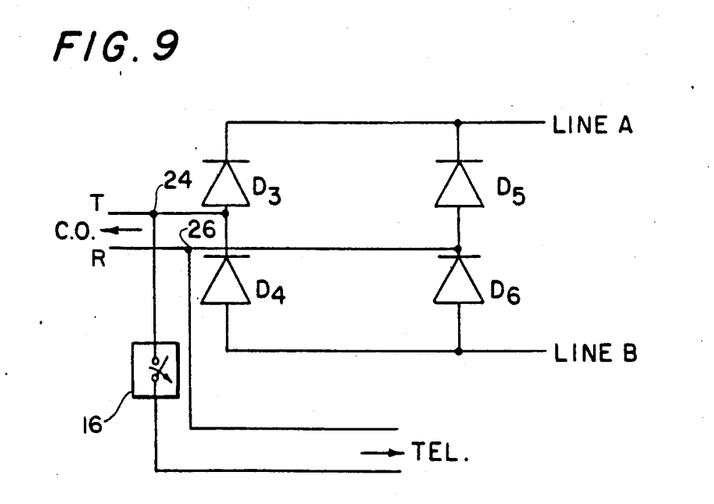
FIG. 9 illustrates an immediate interface between the telephone line and privacy circuits $PC_r$ and $PC_{tr}$.
Figure 10:
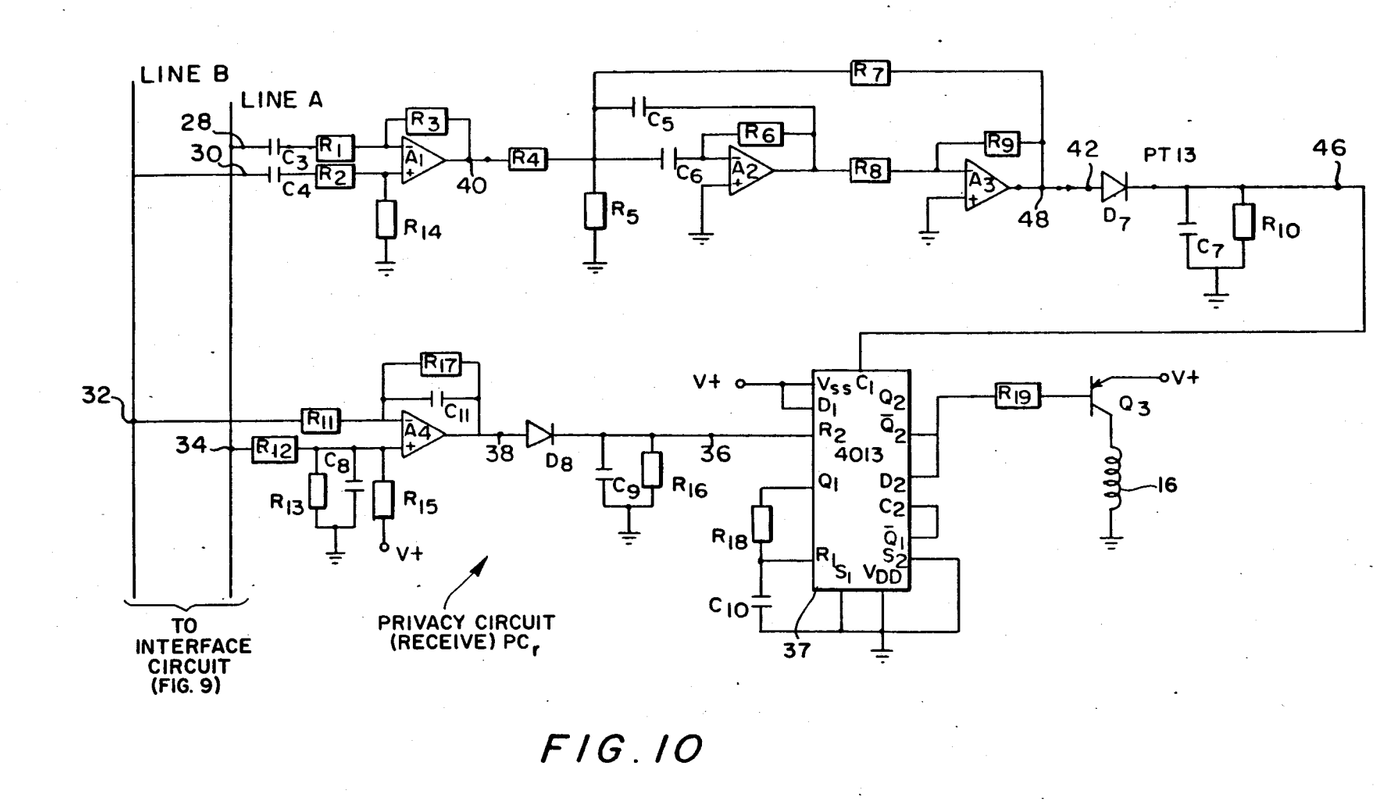
FIG. 10 illustrates detailed electrical circuits of a privacy circuit $PC_r$ coupling to the circuit shown in FIG. 9. Portions of this figure also illustrate circuits of the privacy circuit $PC_{tr}$.

The privacy circuit $PC_r$ and its components are illustrated in detail in FIGS. 8–10.

FIG. 8 shows the power supply of the privacy circuit $PC_r$. Transformer T converts 120 Vac into 9 Vac. Diodes D1 and D2 and capacitors C1 and C2 convert the ac signal at points 20 and 22 into a dc signal of 24 volts across V+ and V−. GND is a ground point at a center voltage of 12 volts.

The result is a ground at GND, 12 volts dc at V+ and −12 volts dc at V−. The three voltage levels compose the dc power of the unit.

With reference to FIG. 9, points 24 and 26 correspond to the tip and ring from the C.O. Two circuits are connected in parallel at points 24 and 26. The first circuit is a diode bridge composed by diodes D3, D4, and D5 and D6. The outputs of the diode bridge, line A and line B, are connected to the circuit of FIG. 10. Due to the diode bridge, the line A and line B ignore any reversal of the tip and ring lines coming from the C.O.

Point 26 is also connected to the tip of the telephone set TEL. Point 24 is connected to the ring of TEL through the relay 16. Relay 16 can connect or disconnect the telephone from the C.O. line.

Referring now to FIG. 10, points 32 and 34 monitor the tip and ring of the C.O. line through the diode bridge D3–D6 of FIG. 9.

Element A4 is an operational amplifier which measures the dc voltage across points 32 and 34. If the dc voltage is 18 volts or above, the telephone line is in the on-hook condition and amplifier A4 outputs 12 volts to point 38. If the voltage across points 32 and 34 is less than 18 volts, the telephone line is in the off-hook condition and amplifier A4 outputs 0 volts to point 38.

Diode D8, capacitor C9 and resistor R16 correct the signal at point 38 and insure that point 36 changes its state only with an on-hook or off-hook transition of the telephone line; a spike in the telephone line is filtered before it reaches point 36.

Point 36 is connected to R2 of the dual D-type (4013) flip-flop device 37. A high (12 volts) in R2 forces Q2* (the * indicates an inverted signal) to be high transistor Q3 is off, and relay 16 is deactivated (normally closed). As shown in FIG. 9, if relay 16 is closed, the telephone TEL is connected to the C.O. line. A low at R2 releases the second flip-flop of the device 37 and the state of Q2* becomes dependent on the clock C2 of the device 37.

Operational amplifier A1 acts as a differential amplifier. The signal at point 40 is proportional to the voltage across points 28 and 30.

Elements A2 and A3 are operational amplifiers which filter the signals at point 40. The filter is a bandpass with a center frequency of 16 Khz. The 16 Khz signal present across line A and line B will appear at point 42.

Diode D7 eliminates the negative component of the signal. Capacitor C7 and resistor R10 turn the signal into a dc voltage. A signal present at point 42 causes point 46 to go to 12 volts dc. No signal at point 42 causes point 46 to go to 0 volts.

Whenever a 16 Khz signal appears across points 28 and 30, 12 volts dc are present at point 46 (high signal). For any frequency other than 16 Khz across points 28 and 30, point 46 is at 0 volts (low signal).

During normal conditions, point 46 is low and thus C1 of the device 37 is low. A low to high transition at C1 of the device 37 causes a high at Q1 and a low at Q1*. A high at Q1 causes capacitor C10 to charge. Once C10 charges, R1 of the device 37 goes high. A high in R1 causes Q1 low and Q1* high. The first flip-flop of the device 37 acts as a time guard and debouncer against any distortion present in a 16 Khz signal across points 28 and 30.

The low to high transition of Q1* is inputed into C2 of the device 37. The second flip-flop of the device 37 is connected as a toggle circuit. Every low to high transition at C2 changes the state of Q2.

Summarizing, an on-hook line condition in the C.O. line of FIG. 9 is detected at points 32 and 34 of FIG. 10, point 36 is high, Q2* is forced high, transistor Q3 is off and the relay 16 of FIG. 9 is closed. An off-hook condition in the C.O. line is detected at points 32 and 34. Point 36 is low and the state of Q2* depends on the signal present at C1 of device 37.

A signal across the tip and ring of the C.O. line of FIG. 9 is detected at points 28 and 30 and is transferred to point 40. The signal is filtered so that only a 16 Khz signal appearing at the tip and ring also appears at point 40 42. The signal at point 42 is converted into a dc signal and inputed into C1 of the device 37. The signal at C1 of the device 37 is processed by the first flip-flop of device 37 and outputted at Q1*. The second flip-flop of device 37 is a toggle circuit that controls the relay 16 of FIG. 9. Every 16 Khz signal burst appearing across the tip and ring of the C.O. line changes the state of relay 16.

Figure 11:
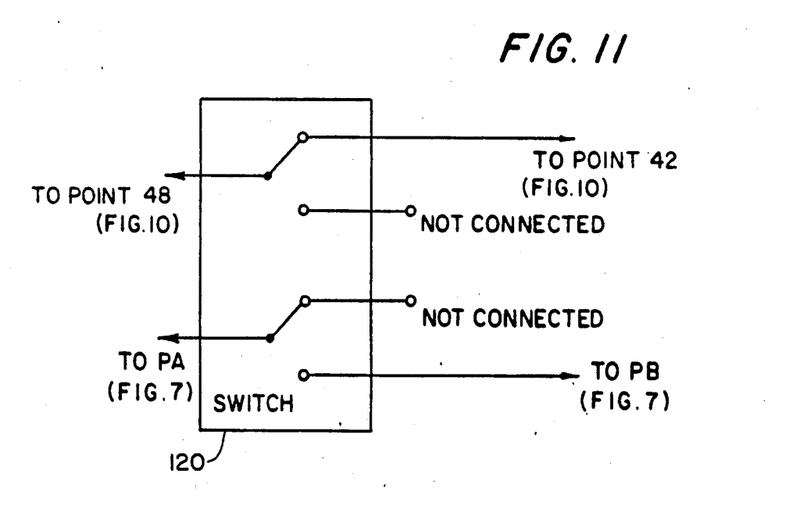
FIG. 11 illustrates a DPDT switch for use in a privacy circuit $PD_{tr}$.

The $PC_{tr}$ is a combination of $PC_t$ and $PC_r$ with necessary modification for proper interface is generally shown in FIG. 6. The discussion above regarding $PC_r$ is similarly applicable to $PC_{tr}$. Referring now to FIG. 11, switch 120 is a DPDT switch. The bottom switch replaces switch 12 of circuit $PC_t$ (FIG. 7). When it is pressed and thus closed, the oscillator 130 (FIG. 6) is connected across the tip and ring of the subscriber line and a tone is generated as previously discussed in connection with FIG. 6. The upper switch is connected between points 48 and 42 in the circuit of FIG. 10. This upper switch is normally closed. When the bottom switch is pressed, the upper switch is open-circuited prior to the tone being transmitted over the subscriber line.

In the context of this discussion, a reference to switch 120 (FIG. 11) being pressed refers to the bottom switch coupled to the oscillator (FIG. 7) being pressed and thereby closed. When switch 120 is pressed, a tone is generated across tip and ring. However, since the output of the bandpass filter 170 is disconnected due to opening of the upper switch, the relay of circuit $PC_{tr}$ is not activated. On the other hand, when switch 120 is not pressed and therefore open, the upper switch is closed. The output of the bandpass filter 170 is connected to the clock input C1 of the device 37 of FIG. 10. The input at C1 of the device 37 is responsible for altering the state of the corresponding relay 16 to disconnect or reconnect a correspondingly coupled phone unit.

SUMMARY OF THE MAJOR ADVANTAGES OF THE INVENTION

The disclosed subject invention provides selective user control over the degree of privacy to be achieved at any given moment of active conversation. Furthermore, a complete telephone extension system may be selectively configured so as to accommodate particular privacy requirements of any given location served by a plurality of extension phones. At least two and up to three different kinds of privacy circuits may be employed for connection between an extension phone and the telephone line, together with other extension phones which may be connected to the line without any intervening privacy circuit. In this manner, privacy control is first effected via selective configuration of phones and corresponding privacy circuits, if any, and then via spontaneous user control during conversation to connect or disconnect other phones. The degree of selective control over extent of privacy is greatly enhanced in a convenient manner through the subject invention.

We claim:

1. A distributed privacy oriented telephone extension system including a plurality of extension phone units coupled to a telephone line, said system comprising:
   a first privacy circuit coupled between a first phone unit and said telephone line; and
   a second privacy circuit coupled between a second phone unit and said telephone line;
   said first privacy circuit including activation means selectively operable by a user after said first phone unit is placed in an off-hook condition for activating said first privacy circuit, and signal generating means responsive to activation of said first privacy circuit by the user after said first phone unit is placed in said off-hook condition for generating a first signal and for transmitting the first signal over said telephone line;
   said second privacy circuit including receiver means responsive to said first signal from said first privacy circuit for disconnecting said second phone unit from said telephone line;
   said signal generating means in said first privacy circuit also being responsive to user activation, after said first phone unit is placed in said off-hook condition and said second phone unit is disconnected, for generating a second signal and transmitting the second signal over said telephone line;
   said receiver means in said second privacy circuit being responsive to the second signal from said first privacy circuit for reconnecting said second phone unit to the telephone line.

2. The system of claim 1, further comprising a third privacy circuit coupled between a third phone unit and said telephone line, said third privacy circuit including transmitter/receiver means responsive to user activation, after said telephone line is placed in said off-hook condition, for generating a first signal and for transmitting the first signal over said telephone line;

said receiver means of said second privacy circuit being responsive to the first signal from said third privacy circuit for disconnecting said second phone unit from said telephone line;

said transmitter/receiver means of said third privacy circuit being responsive to the first signal from said first privacy circuit for disconnecting said third phone unit from said telephone line;

said transmitter/receiver means of said third privacy circuit being also responsive to user activation, after said telephone line is placed in said off-hook condition and said second phone unit is disconnected, for generating a second signal and for transmitting the second signal over said telephone line;

said receiver means of said second privacy circuit being responsive to the second signal from said third privacy circuit for reconnecting said second phone unit to said telephone line;

said transmitter/receiver means of said third privacy circuit being responsive to the second signal from said first privacy circuit for reconnecting said third phone unit to said telephone line;

said transmitter/receiver means of said third privacy circuit being non-responsive to user activation when said telephone line is in said off-hook condition if said third phone unit has been previously disconnected and not yet reconnected.

3. The system of claim 2, wherein said transmitter/receiver means comprises:

a double-pole double-throw switch having a first switching end and a second switching end, said first switching end and said second switching end assuming opposite states in operation;

said first switching end being connected between an oscillator and said telephone line, and being closed in response to external activation for outputting a signal from said oscillator to said telephone line, said second switching end being open when said first switching end is closed;

said first switching end being otherwise ordinarily open while said second switching end is ordinarily closed;

said transmitter/receiver means further comprising a tone detector coupled to said telephone line for sensing a high frequency tone on said telephone line and issuing a corresponding indicating output;

said transmitter/receiver means further comprising a controllable relay connected between said telephone line and said third phone unit, said controllable relay being ordinarily closed when all of said extension phone units are on-hook;

said transmitter/receiver means further comprising a relay control responsive to said indicating output of said tone detector for altering the state of said controllable relay for connecting or disconnecting said third phone unit to or from, respectively, said telephone line;

said second switching end of said double-pole double-throw switch being coupled between said tone detector and said relay control for disabling said system by inhibiting any response of said relay control to said indicating output of said tone detector when said second switching end is open;

said transmitter/receiver means further comprising an off-hook detector coupled between said telephone line and said relay control for inhibiting operation of said relay control when all of said extension phone units are on-hook.

4. The system of claim 3, wherein said relay control includes a first latch connected to a second latch and acting as a monostable triggering circuit;

wherein, upon indication from said off-hook detector that at least one of said extension phone units is off-hook, said second latch assumes a state following an output of said first latch which is indicative of said indicating output from said tone detector; and wherein said relay control controls said controllable relay, said second latch of said relay control acting as a toggle unit for altering a state of said controllable relay.

5. The system of claim 1, wherein:

the first signal and the second signal transmitted over said telephone line by said signal generating means are tones of high frequency above an ordinary voiceband;

said activation means comprises a switch and said signal generating means comprising an oscillator circuit;

said switch is closed in response to user activation for connecting said oscillator circuit across a tip and a ring of said telephone line to generate, on said telephone line, a tone having said high frequency above said ordinary voiceband; and said switch is otherwise ordinarily open in the absence of user activation.

6. The system of claim 5, wherein said receiver means comprises:

a controllable relay for selectively connecting or disconnecting said telephone line to or from, respectively, said second phone unit;

a tone detector for sensing a tone signal on said telephone line and generating an output;

a relay control responsive to said output of said tone detector for altering a state of said controllable relay;

said controllable relay normally being in a closed state when said first phone unit is on-hook;

said receiver means further comprising an off-hook detector coupled to said telephone line for inhibiting operation of said relay control when all of said extension phone units coupled to said line are on-hook and for enabling operation of said relay control when an off-hook condition on said telephone line is detected.

7. The system of claim 6, wherein said tone detector comprises a differential amplifier coupled to said telephone line and a bandpass filter coupled between said differential amplifier and said relay control.

8. The system of claim 7, wherein said signal generating means comprises a Colpitts oscillator enclosed on a rectifying diode bridge.

9. The system of claim 8, wherein said relay control includes a first latch acting as a monostable triggering circuit and a second latch connected to said first latch;

wherein, upon indication from said off-hook detector that at least one of said extension phone units is off-hook, said second latch assumes a state which follows an output of said first latch, said output of said first latch being indicative of said indicating output from said tone detector; and wherein said relay control controls said controllable relay, said second latch acting as a toggle unit for altering a state of said controllable relay.

10. The system of claim 1, wherein the first signal and the second signal transmitted over said telephone line by said first privacy circuit are tones of high frequency above an ordinary voiceband.

11. The system of claim 10, wherein said high frequency is approximately at least 16 kHz.

12. The system of claim 10, wherein each of said privacy circuits has a first modular plug for coupling said each of said privacy circuits to a corresponding telephone, and each of said privacy circuits has a second modular plug for coupling said each of said privacy circuits to said telephone line, whereby each of said privacy circuits is conveniently insertable and removable between said telephone line and said corresponding telephone via said first and second modular plugs.

13. A distributed privacy oriented telephone extension system including a plurality of extension phone units coupled to a telephone line, said system comprising:
   a first privacy circuit coupled between a first phone unit and said telephone line; and
   a second privacy circuit coupled between a second phone unit and said telephone line;
   each of said first privacy circuit and said second privacy circuit including transmitter/receiver means for transmitting and receiving signals over the telephone line;
   said transmitter/receiver means of said first privacy circuit including activation means selectively operable by a user after said first phone unit is placed in an off-hook condition for activating said first privacy circuit, the signal generating means responsive to activation of said first privacy circuit by the user after said first phone unit is placed in said off-hook condition for generating a first signal and for transmitting the first signal over said telephone line;
   said transmitter/receiver means of said second privacy circuit being responsive to the first signal from said first privacy circuit for disconnecting said second phone unit from said telephone line;
   said signal generating means of said transmitter/receiver means of said first privacy circuit being responsive to user activation, after said telephone line is placed in said off-hook condition and said second phone unit is disconnected, for generating a second signal and transmitting the second signal over said telephone line;
   said transmitter/receiver means of said second privacy circuit being responsive to the second signal from said first privacy circuit for reconnecting said second phone unit to the telephone line;
   said transmitter/receiver means of said second privacy circuit including activation means selectively operable by the user after said second phone unit is placed in said off-hook condition for activating said second privacy circuit, and signal generating means responsive to activation of said second privacy circuit by the user after said second phone unit is placed in said off-hook condition for generating a first signal and for transmitting the first signal over said telephone line;
   said transmitter/receiver means of said first privacy circuit being responsive to the first signal from said second privacy circuit for disconnecting said first phone unit from said telephone line;
   said signal generating means of said transmitter/receiver means of said second privacy circuit being responsive to user activation, after said telephone line is placed in said off-hook condition and said first phone unit is disconnected, for generating a second signal and for transmitting the second signal over the telephone line;
   said transmitter/receiver means of said first privacy circuit being responsive to the second signal from said second privacy circuit for reconnecting said first phone unit to said telephone line.

14. The system of claim 13, wherein each of said transmitter/receiver means of said first privacy circuit and said second privacy circuit comprises:
   a double-pole double-throw switch having a first switching end and a second switching end, said first switching end and said second switching end assuming opposite states in operation;
   said first switching end being connected between an oscillator and said telephone line, and being closed in response to external activation for outputting a signal from said oscillator to said telephone line, said second switching end being open when said first switching end is closed;
   said first switching end being otherwise ordinarily open while said second switching end is ordinarily closed;
   each of said transmitter/receiver means further comprising a tone detector coupled to said telephone line for sensing a high frequency tone on said telephone line and issuing a corresponding indicating output;
   each of said transmitter/receiver means further comprising a controllable relay connected between said telephone line and a corresponding one of said first and second phone units, said controllable relay being ordinarily closed when all of said extension phone units are on-hook;
   said transmitter/receiver means further comprising a relay control responsive to said indicating output of said tone detector for altering the state of said controllable relay for connecting or disconnecting said corresponding one of said first and second phone units to or from, respectively, said telephone line;
   said second switching end of said double-pole double-throw switch being coupled between said tone detector and said relay control for disabling said system by inhibiting any response of said relay control to said indicating output of said tone detector when said second switching end is open;
   said transmitter/receiver means further comprising an off-hook detector coupled between said telephone line and said relay control for inhibiting operation of said relay control when all of said extension phone units are on-hook.

15. The system of claim 14, wherein said relay control includes a first latch connected to a second latch and acting as a monostable triggering circuit;
   wherein, upon indication from said off-hook detector that at least one of said extension phone units is off-hook, said second latch assumes a state following an output of said first latch which is indicative of said output from said tone detector; and
   wherein said relay control controls said controllable relay, said second latch of said relay control acting as a toggle unit for altering a state of said controllable relay.

16. The system of claim 13, wherein:

the first signal and the second signal transmitted over said telephone line by said signal generating means are tones of high frequency above an ordinary voiceband;

said activation means comprises a switch and said signal generating means comprising an oscillator circuit;

said switch is closed in response to user activation for connecting said oscillator circuit across a tip and a ring of said telephone line to generate, on said telephone line, a tone having said high frequency above said ordinary voiceband; and said switch is otherwise ordinarily open in the absence of user activation.

17. The system of claim 16, wherein each of said transmitter/receiver means comprises:

a controllable relay for selectively connecting or disconnecting said telephone line to or from, respectively, a corresponding one of said first and second phone units;

a tone detector for sensing a tone signal on said telephone line and generating an output;

a relay control responsive to said output of said tone detector for altering a state of said controllable relay;

said controllable relay normally being in a closed state when all of said extension phone units are on-hook;

each of said transmitter/receiver means further comprising an off-hook detector coupled to said telephone line for inhibiting operation of said relay control when all phones coupled to said line are on-hook and for enabling operation of said relay control when an off-hook condition is detected.

18. The system of claim 17, wherein said tone detector comprises a differential amplifier coupled to said telephone line and a bandpass filter coupled between said differential amplifier and said relay control.

19. The system of claim 18, wherein said signal generating means comprises a Colpitts oscillator enclosed on a rectifying diode bridge.

20. The system of claim 19, wherein said relay control includes a first latch acting as a monostable triggering circuit and a second latch connected to said first latch;

wherein, upon indication from said off-hook detector that at least one of said extension phone units is off-hook, said second latch assumes a state which follows an output of said first latch, said output of said first latch being indicative of said output from said tone detector; and wherein said relay control controls said controllable relay, said second latch acting as a toggle unit for altering a state of said controllable relay.

21. The system of claim 13, wherein the first signal and the second signal transmitted over said telephone line by said first and second privacy circuits are tones of high frequency above an ordinary voiceband.

22. The system of claim 21, wherein said high frequency is approximately at least 16 kHz.

23. The system of claim 21, wherein each of said privacy circuits has a first modular plug for coupling said each of said privacy circuits to a corresponding one of said first and second phone units, and each of said privacy circuits has a second modular plug for coupling said each of said privacy circuits to said telephone line, whereby each of said privacy circuits is conveniently insertable and removable between said telephone line and said corresponding one of said first and second phone units via said first and second modular plugs.

* * * * *